US00RE47090E

(19) United States
(12) Reissued Patent
Suzuki et al.

(10) Patent Number: US RE47,090 E
(45) Date of Reissued Patent: *Oct. 16, 2018

(54) COIL WINDING METHODS AND STRUCTURES FOR A SLOTLESS STATOR IN A MOTOR

(71) Applicant: ResMed Motor Technologies Inc, Chatsworth, CA (US)

(72) Inventors: Hiroshi Suzuki, Canyon Country, CA (US); Peter Jeffrey Thomas, Sylmar, CA (US)

(73) Assignee: ResMed Motor Technologies Inc., Chatsworth, CA (US)

( * ) Notice: This patent is subject to a terminal disclaimer.

(21) Appl. No.: 15/259,663

(22) Filed: Sep. 8, 2016

Related U.S. Patent Documents

Reissue of:
(64) Patent No.: 8,829,756
Issued: Sep. 9, 2014
Appl. No.: 13/732,493
Filed: Jan. 2, 2013

U.S. Applications:
(63) Continuation of application No. 12/448,613, filed as application No. PCT/US2007/026312 on Dec. 26, 2007, now Pat. No. 8,362,669.

(Continued)

(51) Int. Cl.
*H02K 3/04* (2006.01)
*H02K 15/00* (2006.01)

(Continued)

(52) U.S. Cl.
CPC ..... *H02K 15/0471* (2013.01); *H02K 3/28* (2013.01); *H02K 15/0442* (2013.01); *Y10T 29/49009* (2015.01)

(58) Field of Classification Search
CPC .. H02K 15/0471; H02K 15/0442; H02K 3/28; Y10T 29/49009

(Continued)

(56) References Cited

U.S. PATENT DOCUMENTS 3,813,267 A 5/1974 Honjo et al.
3,831,267 A 8/1974 Onishi et al.

(Continued)

FOREIGN PATENT DOCUMENTS

CN 1072047 5/1993
DE 202005017738 * 3/2006 ..... F04D 25/06

(Continued)

OTHER PUBLICATIONS

International Search Report for PCT/US2007/026312, dated May 20, 2008.

(Continued)

*Primary Examiner* — Minh T Nguyen
(74) *Attorney, Agent, or Firm* — Nixon & Vanderhye P.C.

(57) ABSTRACT

A method for making a poly-phase field winding for a slotless stator includes: forming the first coil group by winding an insulated wire for each coil winding in a first direction around a mandrel; axially shifting along the mandrel the insulated wire from a trailing edge of each coil winding a distance substantially equal to one half of twice the number of coil groups multiplied by the number of coil windings minus one times the width of one of the completed windings to position the wires at a leading edge of each of coil winding in the second coil group; forming the second coil group by winding the insulated wire for each coil winding in the first direction; removing the mandrel from the wound coil groups; collapsing the wound coil groups to a single layer web, and wrapping the single layer web into a cylinder to form the field winding.

12 Claims, 15 Drawing Sheets

Related U.S. Application Data

(60) Provisional application No. 60/877,373, filed on Dec. 28, 2006.

(51) Int. Cl.
*H02K 15/04* (2006.01)
*H02K 3/28* (2006.01)

(58) Field of Classification Search
USPC ..... 310/179, 195, 198, 208, 216.002, 254.1; 29/596, 605, 606
See application file for complete search history.

(56) References Cited

U.S. PATENT DOCUMENTS

| | | | | |
|---|---|---|---|---|
| 3,995,364 | A | 12/1976 | Kristiansen | |
| 5,197,180 | A | 3/1993 | Mihalko | |
| 5,200,661 | A * | 4/1993 | Shramo | H02K 3/04 310/156.06 |
| 5,313,131 | A * | 5/1994 | Hibino | H02K 1/12 310/179 |
| 5,425,165 | A | 6/1995 | Shramo et al. | |
| 5,619,085 | A | 4/1997 | Shramo | |
| 5,714,827 | A | 2/1998 | Hansson | |
| 6,034,463 | A * | 3/2000 | Hansson | 310/216.002 |
| 6,355,993 | B1 | 3/2002 | Hazelton et al. | |
| 6,791,224 | B1 | 9/2004 | Ozawa et al. | |
| 6,894,418 | B2 | 5/2005 | Jones et al. | |
| 8,362,669 | B2 * | 1/2013 | Suzuki et al. | 310/184 |
| 8,829,756 | B2 | 9/2014 | Suzuki et al. | |
| 2005/0225197 | A1 | 10/2005 | Nagano et al. | |
| 2007/0176509 | A1 * | 8/2007 | Kalsi et al. | 310/208 |
| 2009/0074594 | A1 * | 3/2009 | Strasser | 417/352 |
| 2010/0090558 | A1 | 4/2010 | Suzuki et al. | |

FOREIGN PATENT DOCUMENTS

| | | |
|---|---|---|
| JP | 49-88003 | 8/1974 |
| JP | H8-501440 | 2/1996 |
| JP | 2799395 | 7/1998 |
| JP | 2005-110454 | 4/2005 |
| KR | 10-0282762 | 11/2000 |
| KR | 10-2003-0018192 | 3/2003 |
| KR | 10-2003-0089546 | 11/2003 |
| KR | 10-2007-0044775 | 4/2007 |
| WO | WO 91/09449 | 6/1991 |
| WO | WO 93/06649 | 4/1993 |

OTHER PUBLICATIONS

Examination Report issued in a related Singapore Appl. No. 200903829-0 (Nov. 25, 2010).

Office Action issued in related Chinese Appl. No. 200780048416.9 (Aug. 25, 2011) with English translation.

Examination Report issued in New Zealand Appl. No. 587620 (Sep. 2, 2010).

Office Action issued in corresponding Japanese Appl. No. 2009-544063 (Oct. 23, 2012) with English translation thereof.

Office Action issued in a corresponding Korean Application No. 10-2009-7015423 dated Jan. 27, 2014, with English language translation thereof.

Office Action issued in corresponding Chinese Appln. No. 201310021865.1 dated May 6, 2014, with English translation thereof.

Office Action issued in corresponding Japanese Appln. No. 2013-112771 dated Jun. 2, 2014, with English translation thereof.

Office Action issued in corresponding Korean Appln. No. 10-2014-7011257 dated Jun. 16, 2014, with English translation thereof.

* cited by examiner

COIL WINDING METHODS AND STRUCTURES FOR A SLOTLESS STATOR IN A MOTOR

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO PRIORITY APPLICATION

This application *is a broadening reissue of U.S. patent application Ser. No. 13/732,493, filed Jan. 2, 2013, now U.S. Pat. No. 8,829,756, which* is a continuation of U.S. patent application Ser. No. 12/448,613, filed Jun. 26, 2009, [allowed] *now U.S. Pat. No. 8,362,669,* which is the U.S. National Phase of International Application. No. PCT/US2007/026312, filed Dec. 26, 2007, which designated the U.S. and claims the benefit of U.S. Provisional Application No. 60/877,373, filed Dec. 28, 2006, each of which is incorporated herein by reference in its entirety.

FIELD OF THE INVENTION

This invention relates to stators for electrically powered motors. In particular, the invention relates to methods for forming a polyphase field winding from a plurality of coil windings for a slotless stator for alternating current (AC) and direct current (DC) electric motors and coil winding topologies for such stators.

BACKGROUND OF THE INVENTION

Motors conventionally have an annular stator surrounding a cylindrical inner rotor, and an air gap between the stator and rotor. The stator typically includes a field winding formed from conductive coil windings. There are a plurality of coil windings in the field winding for a polyphase, e.g., three phase, motors. Each coil winding is formed of an insulated conductor, e.g., a wire, which extends back and forth along the length of the stator. Alternating current through the coil windings creates a rotating electromagnetic field in the hollow portion of the cylindrical stator. A rotor in the stator is turned by the rotating field.

A stator coil winding is conventionally formed by winding a conductive coil(s), e.g., wire, around a mandrel; removing the mandrel from the wound coil(s); collapsing the wound coil(s) to a web, and wrapping the web to form a cylinder to be included in a stator. Known topologies and methods for winding coil windings are disclosed in: U.S. Pat. Nos. 3,813,267; 5,197,180; 5,425,165; 5,619,085; 5,714,827; 6,355,993, and 6,791,224. There is a long felt need for slotless stator coil topologies and winding methods that are relatively easy and inexpensive to perform, and provide an effective field winding for a stator.

SUMMARY OF THE INVENTION

Novel coil winding topologies and methods for winding coils to form the field winding, for a slotless stator in a polyphase motor have been developed. The coil windings are mounted on an inside surface of a flux return ring, and form an annulus around a rotor that is coaxial to the stator and return ring. Electromotive force, applied to the coil windings of the stator, drive the rotor at a speed and torque dependent on the power of the applied electromotive force. The electromotive force is typically a polyphase alternating current (AC) voltage, such as a three-phase AC voltage. The stator field winding includes a separate coil winding for each phase of the AC voltage.

The coil winding topologies disclosed herein are also applicable for use as a stator in an electrical generator. The winding methods form multiple coil windings, e.g., three (A, B, C), for a polyphase, e.g., three-phase, slotless stator. The stator coil windings may be used in a small motor for a blower in a sleep apnea treatment device.

A method is disclosed herein for making a poly-phase field winding, such as a three phase field winding, for a slotless stator including a plurality of coil windings arranged in a first coil group and a second coil group, said method comprising: forming the first coil group by winding an insulated wire for each coil winding around a mandrel such that each turn of the wire is adjacent a next turn of the wire, wherein each coil winding in the first coil group has substantially the same coil width when completed and a separation between adjacent coil windings in the first coil group is a distance substantially equal to the width of one of the completed windings; after forming the first coil group, axially shifting along the mandrel the insulated wire from a trailing edge of each coil winding a distance substantially equal to five times the width of one of the completed windings to position the wires at a leading edge of each of coil winding in the second coil group; forming the second coil group by winding the insulated wire for each coil winding around a mandrel such that each turn of the wire is adjacent a next turn of the wire, wherein each coil winding in the second coil group and the first coil group has substantially the same coil width when completed and wherein a winding direction of the second coil group is the same as or opposite to a winding direction of the first coil group and a separation between adjacent coil windings in the first coil group is a distance substantially equal to the width of one, of the completed windings; removing the mandrel from the wound first and second coil groups; collapsing the wound first coil group and the second coil group to a single layer web such that coil winding segments from the first coil group interleave between coil winding segments of the second coil group, and wrapping the single layer web into a cylinder to form the field winding.

A poly-phase field winding, such as a three-phase field winding, for a slotless stator is disclosed comprising: a plurality of coil windings including a first coil group and a second coil group; the first coil group including a first spiral winding of an insulated wire for each coil winding, wherein the wire is wound around a mandrel such that each turn of the wire is adjacent a next turn of the wire and a gap between adjacent coil windings on the mandrel in the first coil group is substantially equal to a width of a coil winding in the first group; the second coil group including a second spiral winding of the insulated wire for each coil winding, wherein the wire is wound around a mandrel such that each turn of the wire is adjacent a next turn of the wire, wherein each coil winding in the second coil group and the first coil group has substantially the same coil width when completed, a gap between adjacent coil windings on the mandrel in the second coil group is substantially equal to a width of a coil winding in the second group, and a winding direction of the second coil group is opposite to the first coil group, and a cylindrical web including the first coil group and the second coil group collapsed such that coil winding segments from the first coil group are interleaved between coil winding segments of the second coil group.

A method is disclosed for making a three-phase field winding for a slotless stator including a three coil windings, said method comprising: forming a coil group of the three coil windings by winding an insulated wire for each coil winding around a mandrel such that each turn of the wire is adjacent a next turn of the wire, wherein each coil winding in the first coil group has substantially the same coil width when completed and a separation between adjacent coil windings in the first coil group is a distance substantially equal to the width of one of the completed windings; removing the mandrel from the wound coil group; collapsing the wound coil group such that coil winding segments from a first side of the mandrel interleave between coil winding segments from an opposite side of the mandrel, and wrapping the single layer web into a cylinder to form the field winding, wherein a coil winding segment on one end of the web interleaves between coil winding segments at an opposite end of the web and winding segments from the same coil winding are on opposite sides of the cylinder.

A method is disclosed for winding a field for a electromagnetic polyphase device comprising: spirally winding a plurality of insulated conductors about a mandrel to form a first group of coil windings, wherein the wound coils in the first group is immediately adjacent on the mandrel at least one of the other wound coils in the first group; shifting a length of the conductors axially along the mandrel a distance substantially equal to a width of the wound coils in the first group, starting at the distance substantially equal to the width of the wound coils from the first group from a trailing edge of the first group of coil windings, spirally winding a second group of coils in a same winding direction as used for the first group, wherein the wound coils in the second group formed are immediately adjacent on the mandrel at least one of the other wound coils in the first group; removing the mandrel and flattening the coil to form a single layered web including coil segments from the first group interleaved with coil segments from the second group, and wrapping the web into a two-layered cylinder in which coils from the first group are overlapped coils form the second group formed by the same conductors.

DETAILED DESCRIPTION OF THE ILLUSTRATED EMBODIMENTS

Figure 1:
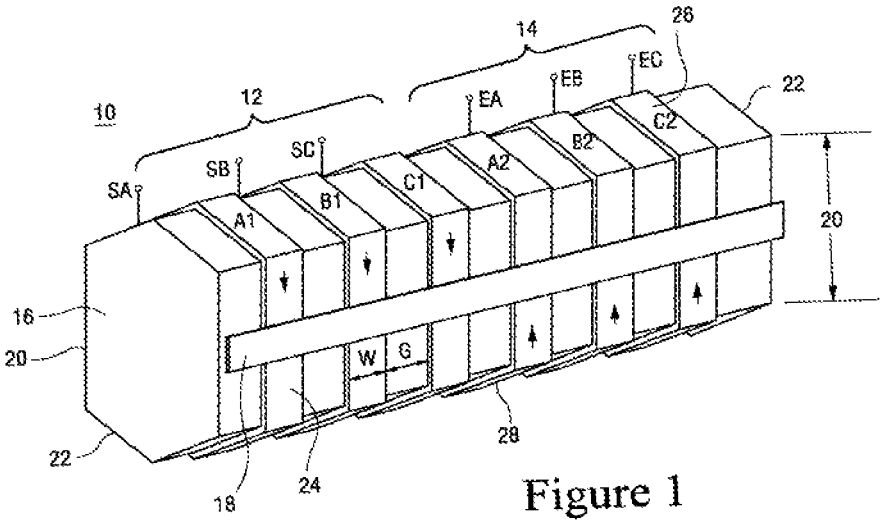
FIG. 1 is a schematic diagram of a first arrangement of three coil windings wrapped in two coil groups on a mandrel.

FIG. 1 is a schematic diagram of a first arrangement 10 of three coil windings (A, B, C) wrapped in two coil groups 12, 14 (A1, B1 and C1, and A2, B2 and C2) on a mandrel 16. Conductive insulted wires are coiled around the mandrel to form the groups of each coil winding. Strips of adhesive tape 18 are applied to opposite sides of the coil groups to temporally hold the coils together. The tape assists in maintaining the distances between the coils and coil groups after the mandrel is removed and as the arrangement 10 is collapsed into a web (see FIG. 2).

The racetrack shaped cross-section of the mandrel 16 has generally straight sided opposite wall sections 20 and crested top and bottom sides 22. The mandrel preferably has a hexagon cross-section, but may have another polygon cross-section, or have two opposite wall sections 20 and a curved top and bottom sides 22.

The wall sections 20 of the mandrel tend to have a common length and be longer than the top and bottom sides. The wall sections 20 are used to form the straight segments 24, 26 (see FIG. 2) of the coil winding that are to be arranged in a cylinder and face the rotor in a motor. The wall sections 20 have a width substantially the same as the length of the stator coil segments to be formed.

The coil sections that lie on the top and bottom sides 22 of the mandrel form the end turn sections 28 of the coil windings. The width of the mandrel, i.e., the distance between opposite wall sections 20, determines the width of the end turn sections of the coils 28. The end turns must have a length sufficient to span the gap between connected coil groups, e.g., A1 and A2, when the coils are flattened into a web. Accordingly, the width of the mandrel must be sufficient so that the end turns have their needed lengths.

When formed into a stator, the coil segments 24, 26 are arranged in a cylinder of the stator. The coil segments are parallel and adjacent the rotor. The coil segments are arranged on an inside cylindrical surface of the stator, separated by an annular air gap from the rotor, and extend the length of the rotor. The end turn sections 28 of the coils connect adjacent straight coil segments 24, 26. The end turn sections 28 are folded or otherwise arranged to be compact. In a typical coil winding, the straight coil segments 24, 26, and end turn sections 28 will alternate in a continuous conductive wire having an insulating sheath. The width of the end turn sections, e.g., the distance between opposite wall sections 20, is sufficient to allow the end turns to span the distance between the connected coil groups with the coil is folded.

Each coil group 12, 14 is formed by winding the wires in a tight spiral where each turn of the wire is adjacent the next in each coil winding. The ends at the start turn of each winding is indicated by SA, SB and SC respectively. The ends at the last turn of each coil winding is indicated by EA, EB and EC, respectively. Automatic coil winding mechanisms, which are well known in the art, may be used to automatically wind the wires around the mandrel. The wires of each winding are first wound in a first direction (winding directions indicated by arrows) to form a first group 12 of a coil. The first coil group comprises a predetermined number of turns of the wire, for example 25 to 250 turns. The wire turns are typically tightly packed together in a side-by-side arrangement against the surface of the mandrel to form a single layer of wound coils.

A separate wire is used to form each coil winding. As shown in FIG. 1, three insulated wires (A, B, C) are wound around the mandrel. The wires are initially wound in a first direction to form the first group 12 of coils. Each coil group (A1, B1, C1) corresponds to a separate insulated wire being wound about the mandrel. Each coil group has substantially the same number of windings such that the width of each coil group and the number of turns in each coil group is substantially the same.

The separation between adjacent coil groups, e.g., the gap (G) between a trailing edge of coil group A1 and a leading edge of coil group B1, may be the width (w) of a coil segment. This gap allows a coil segment to be seated in the gap with no overlapping coils when the coils are flattened into a single layer web (See FIG. 2).

After the first group of coil windings (A1, B1, C1) has been wound and before the next group (A2, B2, C2) of coil windings is wound, the conductive wires extending from each completed coil group 12 are shifted axially along the mandrel. The axial shift moves the conductive wires from the trailing edge of a completed first coil group, e.g., A1, to a leading edge of a second coil group, e.g., A2, to be wound. For a three-phase coil with two coil groups, the distance of the axial shift is five (5) times the width (w) of a coil winding segment. The axial shift will be different for polyphase coil windings having other than three phases and different numbers of coil groups. In general, the axial shift from a completed coil group 12 to a new coil group 14 is [the number of coil groups times] *twice* the number of coil windings, minus one. This axial shift algorithm will provide on the mandrel coil windings that can be folded into a single layer sheet.

The conductive wires for each coil (A, B, C) are wound first in one direction, e.g., clockwise, to form a first coil group (A1, B1, and C1) and then in another opposite direction, e.g., counter-clockwise, to form a second coil group (A2, B2, and C2). The winding direction is indicated by arrows in the figures. Additional coil groups can be formed by alternatively winding the coils in clockwise and counter-clockwise directions around the mandrel. The winding of groups of coils is repeated by reversing the winding direction until the desired number of groups of coils has been formed.

The mandrel is removed from the wound coils after the winding is completed. As the mandrel is removed, the adhesive tape 18 retains the position of the coil groups such that the wires remain side-by-side in their respective coil group and the gaps remain between the coil groups. The adhesive tape is typically two strips of tape on opposite sides of each of the coil segments 24, 26. A first strip of adhesive tape is secured to the surface of the mandrel with the adhesive surface facing outward to receive the wound coil. The second strip of tape is applied to the coil segment after the winding process is completed and is typically applied to overlie the first tape strip.

Figure 2:
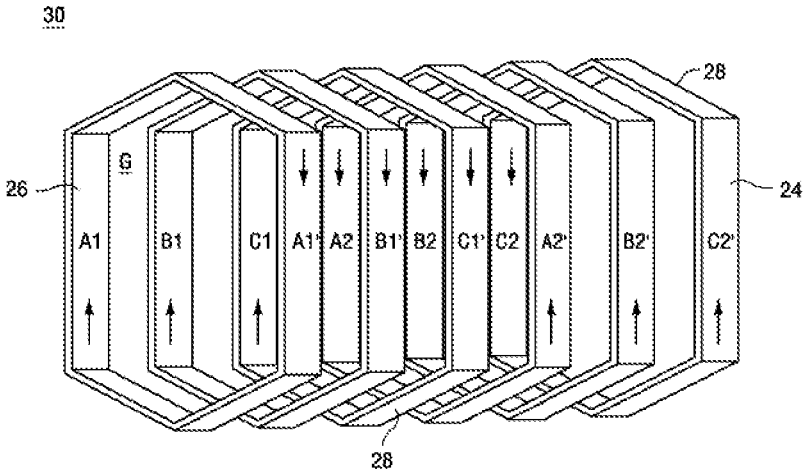
FIG. 2 is a schematic diagram of the coils shown in FIG. 1 with the mandrel removed and the coil windings collapsed in a single layered web.

FIG. 2 shows the coil winding after removal of the mandrel. The coils are flattened into a single layered web 30. To ensure proper overlapping of coil segments, a segment, e.g., A1', on a first side of the coil is shifted axially towards a position in a gap between selected segments, e.g., C1 and A2, on an opposite side of the coils. The coil segments are arranged in the web such that the segments (e.g., A1, B1, C1, A1', A2, B1', B2, C1', C2, A2', B2' and C2') are in parallel and do not overlap. The coil segments 24, 26 (A1, B1, C1, A1', B1' and C1') are the portions of the web that will form the stator sections adjacent the rotor. The coil segments 24, 26 will be arranged in the stator such that they are parallel to the rotational axis of the rotor.

The coils segments 24, 26 are arranged such that the winding direction (see arrows on segments in FIGS. 1 and 2) are parallel for adjacent segments from the same coil winding. For example, the web has adjacent segments A1' and A2 that were wound in the same winding direction on the mandrel. Similarly, each pair of adjacent segments B1', B2; C1', C2; A2, A1'; B2', B1, and C1, C2' have the same winding direction. As the coil is flattened into the web, the coil segments formed on one side of the mandrel, e.g., the segments identified with a prime ("") in the reference numbers shown in FIG. 2, are interleaved with the coil segments, e.g., without a prime reference number, formed on the opposite side of the mandrel. The interleaving of coil segments positions segments from one coil group between coil segments from another coil group. The coil groups are wound in opposite directions so that when the coil segments are interleaved the winding directions are the same for adjacent coil segments from the same coil.

The direction of electric current through a coil segment depends on the winding direction of the segment. Positioning coil segments from the same coil such that adjacent segments have the same winding direction ensures that the current direction is the same through adjacent segments.

The coil segments 24, 26 do not overlap when collapsed into a web. The end turn portions of the coil join the segments (A1 to A1', B1 to B1', and C1 to C1'). The end turn sections will partially overlap when the web is formed. The overlapping is incidental to the flattening process and does not constitute overlapping of the coil segments.

The coil segments (A1, B1 and B2' and C2') nearest the ends of the web are separated from each other by a gap (G). These gaps will receive the coil segments from the opposite end of the web. In particular, segment A1 will fit in the gap between segments A2' and B2', and the segment B1 will fit in the gap between segments B2' and C2' when the web is rolled into a cylinder.

Figure 3:
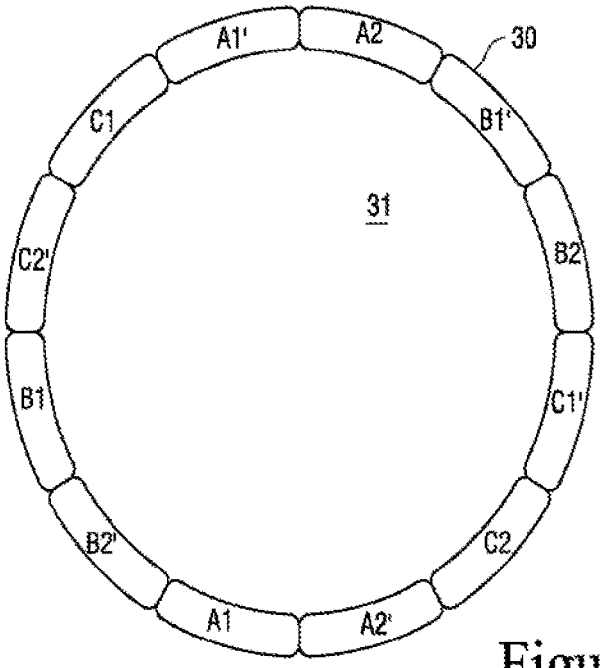
FIG. 3 is a schematic cross-sectional diagram of an end view of a web of coils shown in FIG. 2 arranged in a single layered cylindrical web.

FIG. 3 is a cross-sectional view of the web segments of the web 30 formed into a stator field winding 31. The web is rolled into a cylindrical shape without overlapping coil segments. The coil segment (A1, C1') at the ends of the web interleave with other coil segments and do not overlap these other segments. The segments are arranged in the cylindrical stator field winding 31, such that a coil segment from a first group (A1, B1, C1) is adjacent a coil segment from the second group (A2, B2, C2) of the same coil. The inner diameter of the cylindrical web is substantially the diameter of the interior diameter of the stator. The stator segments are parallel to the axis of the cylinder. The rotor (see rotor represented by the North and South poles in FIG. 4) fits coaxially in the cylindrical stator field winding 31 formed by the web 30.

The coil segments from each of the coil windings (A, B, C) are arranged in the stator such that current flows in one direction on one side of the stator and in an opposite direction on the other side of the stator. The direction in which the coil segments 24, 26 (FIG. 1) are wound on the mandrel determines current flow direction. In coil A, for example, segments A1' and A2 have a first winding direction (See FIG. 2) and segments A1 and A2' on the opposite side of the stator have an opposite winding direction. Accordingly, the current direction through segments A1' and A2 is the same and opposite to the current direction in segments A1 and A2'. Similarly, the current direction for segments C2' and C1 is the same and opposite to the current direction for segments C2 and C1' on the other side of the stator. Further, the current direction for segments B1 and B2' is the same and opposite to that for segments B1' and B2. Accordingly, current flows in one direction on one side of the stator cylinder and in an opposition direction on the opposite side of the cylinder.

Figure 4:
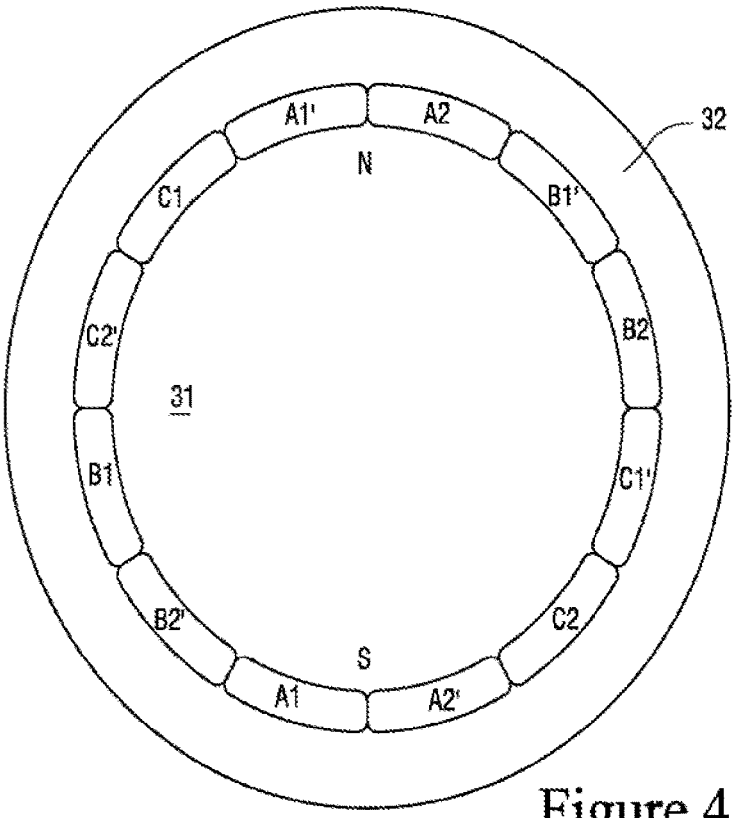
FIG. 4 is a schematic diagram of an end view of a cylindrical web shown in FIG. 2 mounted in a flux return ring to form a stator.

FIG. 4 shows the cylindrically shaped stator field winding 31 inserted into a ferromagnetic ring 32 that provides a magnetic flux return path. An arbor may be inserted into the inner periphery of the cylinder formed by the coil web to establish the insider diameter (ID) of the stator. Further, the end turns 28 of the coil windings are arranged tightly on opposite ends of each segment (at opposite ends of the stator) to minimize the overall stator height. The coils are secured to the return path ring 32 using various means including varnishing the coils to the inner periphery of the ring or molding the coil to the ring. The web and return path form a slotless stator. The cylindrical stator field winding 31 may be included in a motor or generator having a rotating rotor represented by rotor poles North (N) and South (S).

Figure 5:
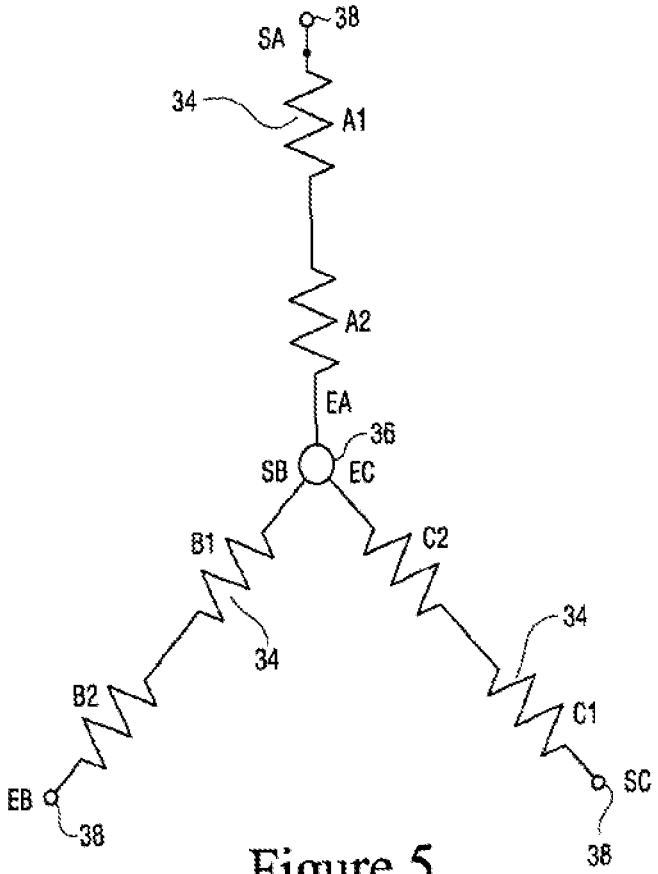
FIG. 5 is a schematic diagram of an electrical three-phase coil arrangement representing the first coil winding arrangement shown in FIGS. 1 to 4.

FIG. 5 is an electrical schematic diagram showing the conductive paths of the stator field winding 31 of FIG. 4. Each coil group, e.g., A1, is represented as a resistor 34 to reflect the slight resistance of each winding in each conductive coil group. The coil groups (A1, A2) are connected in series in their respective coil winding. The three coil windings (A1 & A2; B1 & B2, and C1 & C2) are connected to a common terminal 36, e.g., a center tap. The opposite ends of each winding have a terminal 38 connected to a phase terminal of the power source for the motor. The ends of each winding is corresponding to the first winding turn are labeled SA, SB and SC on FIG. 5 (see also FIG. 1) to indicate the location of the start of the coil in the schematic diagram. The last turn EA, EB and EC, respectively, of each winding is also indicated in FIGS. 5 and 1.

Figure 6:
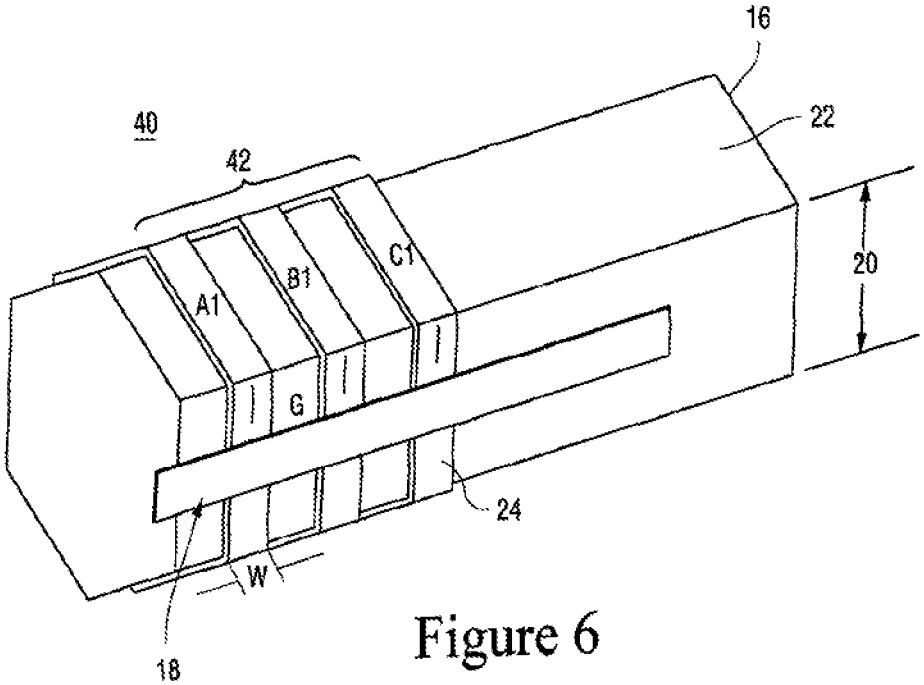
FIG. 6 is a schematic diagram of a second arrangement of three coil windings each having a single coil group and wrapped around a mandrel.
Figure 7:
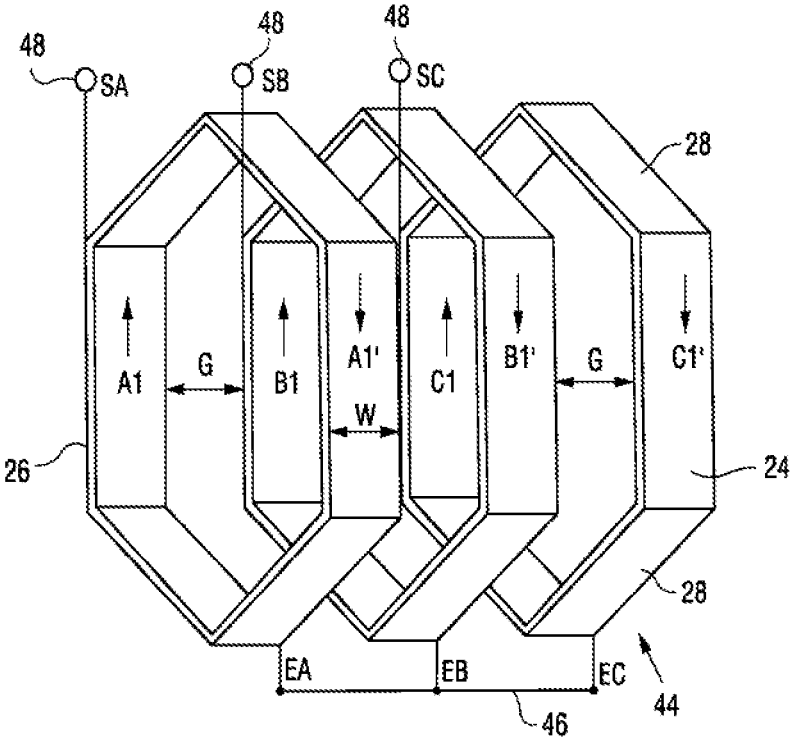
FIG. 7 is a schematic diagram of the second arrangement of coil windings with the mandrel removed and the coils collapsed to a single layered web.

FIG. 6 is schematic diagram showing a second coil winding arrangement 40 on a mandrel 16. The three coil windings (A, B and C) have a single coil group 42 all wound in a single direction (see arrows) around the mandrel. Strips of adhesive tape 18 on opposite sides 20 of the mandrel secure the coil segments 24, 26 (FIG. 7). The gap (G) between adjacent coils is substantially equal to the width (W) of a coil segment.

FIG. 7 shows the coil windings 40 after the mandrel is removed and after the coil has been flattened into a web 44. The initial turns of each winding are labeled SA, SB and SC, respectively, and the last turn of each winding are labeled EA, EB and EC, respectively. The adhesive tape may or may not be removed when the coil is flattened to a web. As the coil is flattened, the coil segments 24 (A1', B1' and C1') from one side of the mandrel are shifted axially to interleave in the gaps (G) between the coil segments 26 (A1, B1 and C1) from the opposite side of the mandrel.

The interleaving coil segments 24, 26 do not overlap. The segments 24 from one side of the mandrel are seated in the gaps (G) between the segments from the other side of the mandrel. The flatten segments form a single layered web 44. The end turn sections 28 connecting the coil segment in series in each coil winding may overlap as they are folded into the web. The end turns may be arranged such that they do not excessively increase the length or area of the web much beyond the area needed to form the stator coil segments 24, 26.

The coils (A, B and C) each form an electrical path having a common terminal 46 at one end of each coil winding and a separate terminal 48 for each coil, at an opposite end of the coil winding. The separate terminal 48 is coupled to a respective phase of a power source for the motor. The common terminal 46 may be connected to ground.

Figure 8:
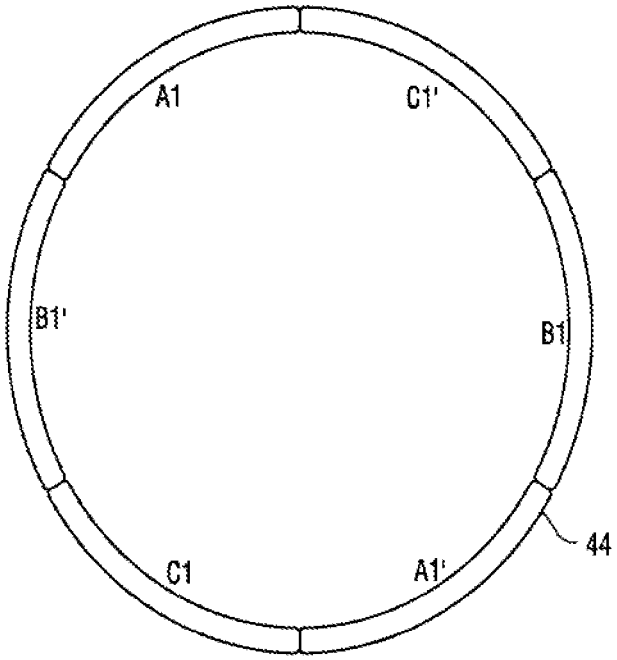
FIG. 8 is a schematic cross-sectional diagram of an end view of a web of coil windings from FIG. 7, and shaped into a cylinder.
Figure 9:
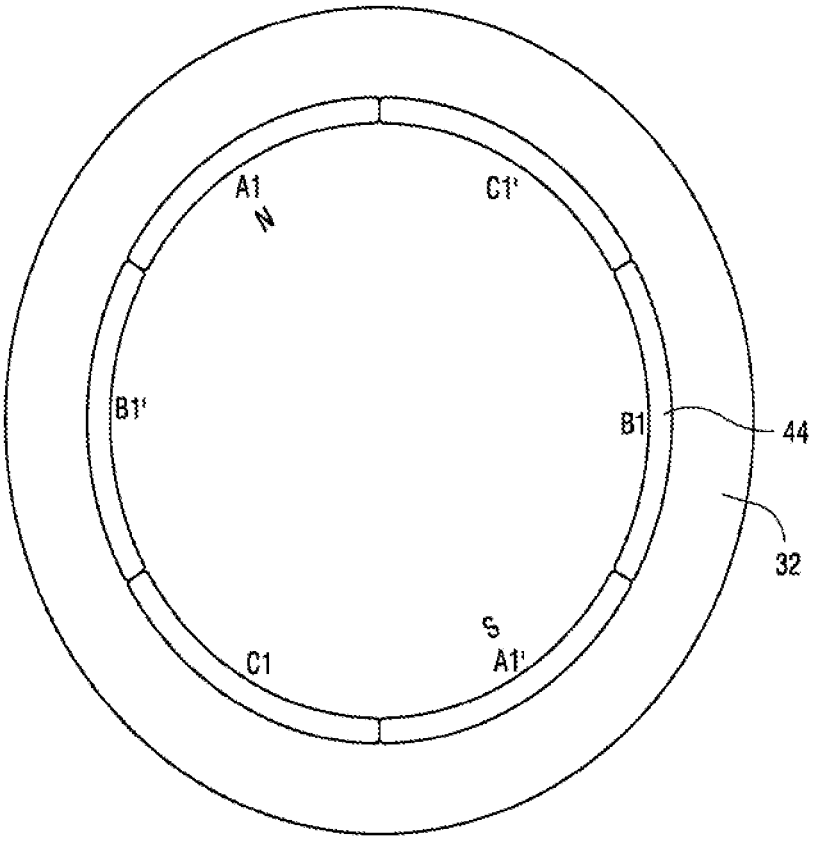
FIG. 9 is a schematic cross-sectional diagram of an end view of a cylindrical coil web of FIG. 8 mounted in a flux return ring.

FIG. 8 is a schematic cross-sectional view of the web 44 formed into a cylinder for a stator. FIG. 9 is an schematic cross-sectional view of the web 44 shown mounted on the inner surface of a flux return ring 32. The end coil segments (A1, C1') fit in the gaps (G) between B1' and C1' and between A1 and B1, respectively. The two coil segments for each winding are on opposite sides of the cylinder. For example, segment A1 is on the opposite side of the cylinder for segment A1'. The winding direction for A1 is opposite to that for A1' (see winding arrows in FIG. 7). In each coil, current flows in one direction on one side of the cylinder, e.g., through segment A1, and in an opposite direction on the opposite side of the stator cylinder, e.g., through segment A1'. Accordingly, current flows in each coil in one direction on one side of the stator cylinder and in an opposition direction on the opposite side of the cylinder.

Figure 10:
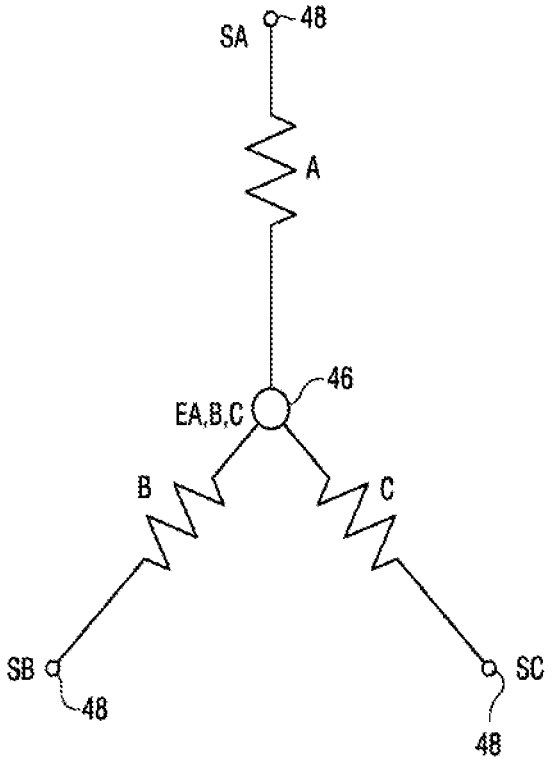
FIG. 10 is a schematic diagram of an electrical three-phase coil arrangement representing the second coil winding arrangement.

FIG. 10 is an electrical schematic diagram of the three-phase stator winding shown in FIG. 9. The coil windings for each phase are labeled A, B and C, respectively. The power terminals 48 (SA, SB and SC) for each winding are connectable to a respective phase of a three-phase power supply. The common terminal 46 is also connectable to the power supply, such as via a ground connection. The first turns of each winding are labeled SA, SB and SC, respectively. The last turn of each winding connected together and are labeled EA, EB and EC.

Figure 11:
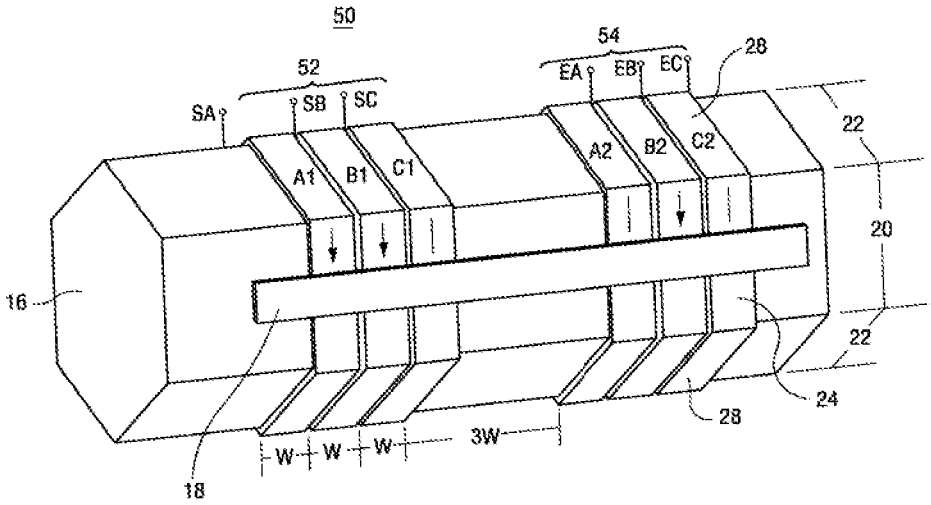
FIG. 11 of a third arrangement of three coil windings wrapped in two coil groups on a mandrel.

FIG. 11 is a schematic diagram of a further coil winding arrangement having three coil windings (A, B and C) each arranged in a first coil group 52 and a second coil group 54. The coil groups are each wound in the same winding direction, e.g., clockwise (see arrows on coils).

Each coil is formed by winding an insulated wire around the mandrel 16. The start of each wire is indicated by SA, SB and SC, respectively. The terminal end of each wire is indicated by EA, EB and EC, respectively. The three wires that form the three coil windings of a three-phase field winding are first wound together around the mandrel to each form the first coil group 52. The coil group is spirally wound and tightly packed such that each turn of a wire is positioned adjacent the preceding turn of the wire on the mandrel. Further, the completed coil windings (A1, B1 and C1) in the first group are adjacent each other such that there is no gap between the coil windings A1 and B1, and between B1 and C1. The starting position on the mandrel for coil windings B1 and C1 is a distance W and 2×W, respectively, from the start of winding coil winding A1, where W is the width of a completed coil winding. The coil windings in each group preferably each have a common width (W).

After completion of the winding process of the first coil group 52, the coil wires are shifted from the trailing edge of each winding in the first group axially along the mandrel to start the leading edge of each coil of the second coil group 54. The axial shift is 5×W, or more generically twice the combined width of the coils in a group minus the width (W) of one coil winding (w) in a group. After the axial shift, the coil wires are wound around the mandrel to form the second coil groups 54. The winding direction is in the same direction as used to wind the first coil groups 52.

Figure 12:
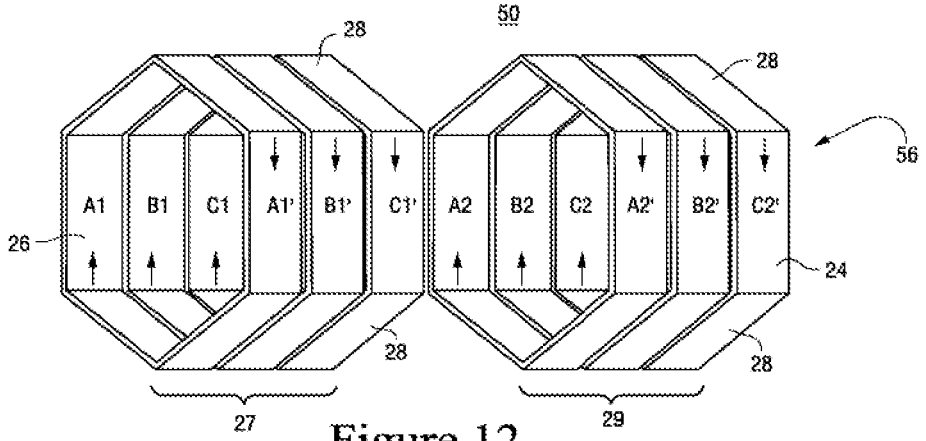
FIG. 12 is a schematic diagram of the third arrangement of coil windings with the mandrel removed and the coils collapsed into a double layered web.

FIG. 12 is a schematic view of a further winding arrangement 50 after the mandrel 16 and the adhesive tape strips 18 are removed from the coil segments 24, 26. The coiled windings are collapsed into a single layered web 56. The coil segments (A1', B1' and C1') 24 from the first coil group are interleaved form the coil segments (A1, B1, C1 and A2, B2 and C2) 26 from the first and second coil groups 27, 29. The coil segments in the web 56 are side-by-side along the length of the web 56. The winding directions (see arrows) of adjacent three sets of coil groups, e.g., A1, B1 and C1 vs. A1', B1' and C1', are reversed. The winding direction reverses four times along the length of the web 56.

Figure 13:
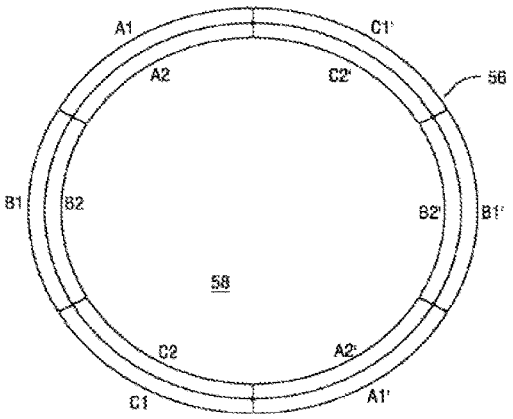
FIG. 13 is a schematic cross-sectional diagram of an end view of a web of coil windings of FIG. 12 arranged in a doubled layered cylinder.

FIG. 13 is a cross-sectional end view of the web 56 wrapped into a double layered stator cylinder 58. The layers of the cylinder each include two sets of the three coil groups. The outer layer includes coil groups segments A1, B1, C1 of the first coil group 27 and segments A1', B1' and C1' of the first coil group 27. The inner layer includes coil groups segments A2, B2, C2 of coil group 29 and segments A2', B2' and C2' of coil group 29. The overlapping coil segments, e.g., A1 and A2, have the same winding direction (see FIG. 11) so that the current direction is the same through overlapping segments. Further, the coil segments, e.g., A1' and A2', having an opposite winding direction and from the same coil winding, e.g. A, are on the opposite side of the cylinder. Accordingly, current flows in each coil winding in one direction on one side of the stator cylinder and in an opposition direction on the opposite side of the cylinder.

Figure 14:
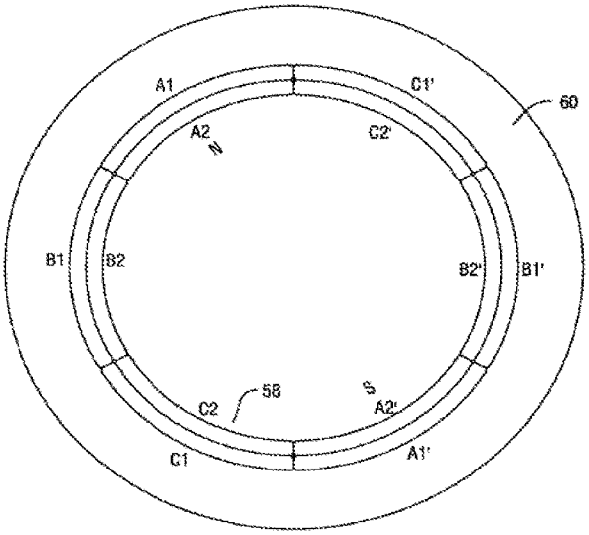
FIG. 14 is a schematic cross-sectional diagram of an end view of the double-layered cylindrical coil winding web of FIG. 13 mounted in a flux return ring.

FIG. 14 is a cross-sectional end view of the stator cylinder 58 mounted on the inside surface of a ferromagnetic flux return ring 60. The cylinder may be glued to the ring 60 and the ring and cylinder may be coated with sealants and other coatings well know in the art for forming a stator. Further, the end turns 28 of the coil winding that forms the stator cylinder are arranged along an inside surface of the web to minimize the depth of the ring and avoid electrical interference with the stator segments 24, 26 that are parallel to the axis of the ring 60 and an axis of the rotor inserted in the cylinder.

Figure 15:
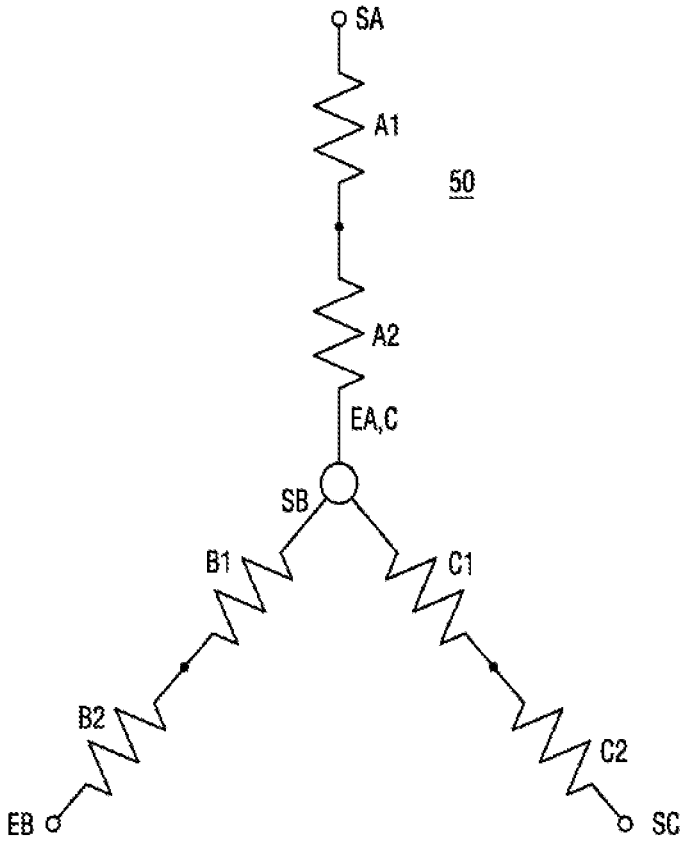
FIG. 15 is a schematic diagram of an electrical three-phase coil arrangement representing the third coil winding arrangement.

FIG. 15 is a schematic diagram of the coil winding arrangement 50 having three coil windings (A, B and C) each arranged in a first coil group 27 (A1, B1, and C1) and a second coil group 29 (A2, B2 and C2). The start of the first winding turn is labeled SA, SB and SC, respectively, for each coil winding. The last winding turn is labeled EA, EB and EC, respectively, for each coil winding.

Figure 16:
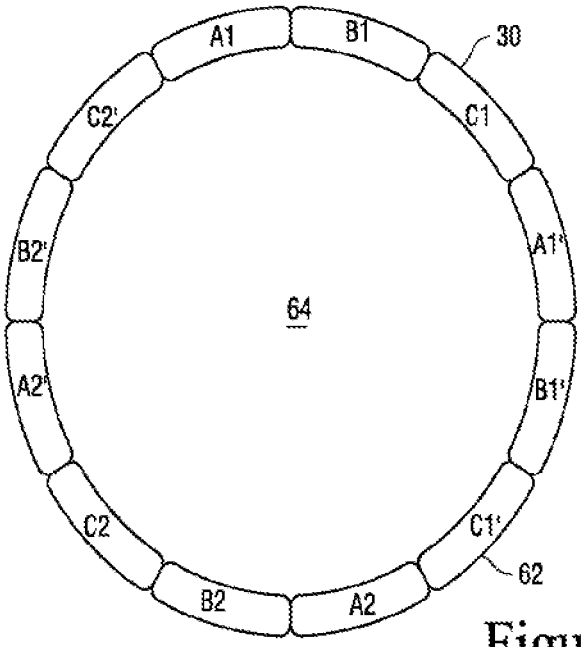
FIG. 16 is a schematic cross-sectional diagram of an end view of a web of coil windings of FIG. 12 arranged in a single layer cylinder.

FIG. 16 is a cross-sectional end view of a single layered web 62 shaped into a cylinder 64 to form the field windings for a stator. The web 62 is formed of coils (A, B and C), each arranged in two or more coil groups, such as A1 and A2. The coils are wrapped on a mandrel and formed in a web in the same manner that is described above in connection with FIGS. 11 and 12. The segments of the coils are flattened to form the web 62 such that the segments do not overlap.

Figure 17:
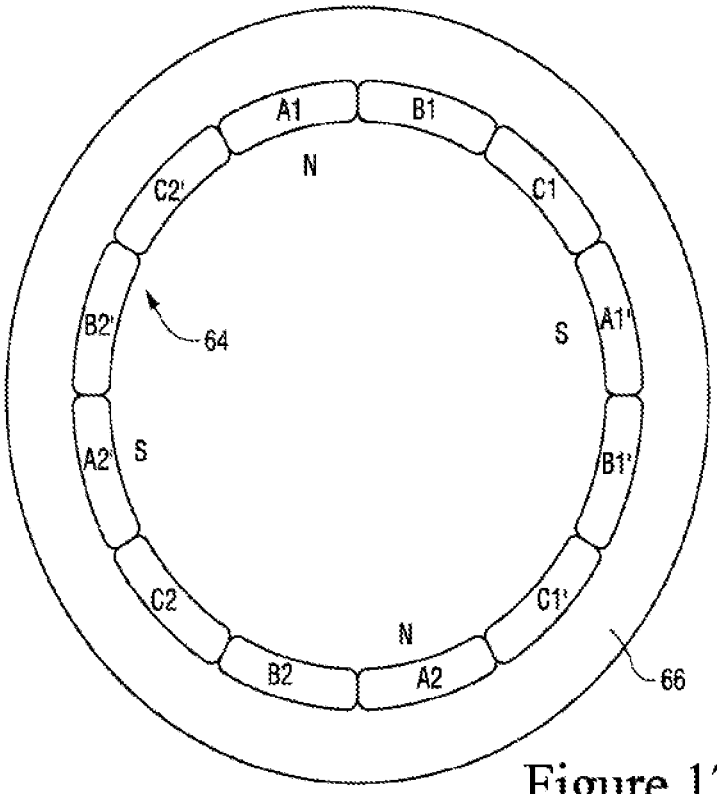
FIG. 17 is a cross-sectional diagram of an end view of the single layered cylindrical coil winding web of FIG. 16 mounted in a flux return ring.

FIG. 17 is a cross-sectional end view of the stator cylinder 64 mounted on the inside surface of a ferromagnetic flux return ring 66. The cylinder may be glued to the ring, and the ring and cylinder may be coated with sealants and other coatings well know in the art for forming a stator. Further, the end turns of the coil winding that forms the stator cylinder are arranged along an inside surface of the web to minimize the depth of the ring and avoid electrical interference with the stator segments that are parallel to the axis of the ring 66 and an axis of the rotor inserted in the cylinder.

The web 60 is arranged such that coils segments formed on the same side of the mandrel from two groups of the same coil, e.g., A1 and A2, are arranged opposite to each other in the cylinder 64. The current direction is the same through each of these opposite segments, due to the manner in which the coil is wound on the mandrel. Similarly, the opposite segments, e.g., A1' and A2', of the same coil are arranged at positions in the cylinder 64 separated by 90 degrees from the position of the coils segments A1 and A2. Current flows in the sane direction through the opposite segments A1' and A2', which is opposite to the current direction through the segments A1 and A2. The arrangement of coil segments in cylinder 64 is suitable for a four-pole rotor represented by the four poles (NSNS) shown in FIG. 17. The polarity of a four pole rotor is North-South-North-South, where each of these poles is separated by 90 degrees. In contrast, the stator cylinders shown in FIGS. 4, 9 and 14 are configured for a two-pole rotor having a single North Pole and a single South pole, where both poles are separated by 180 degrees. These two-pole rotors are represented by NS in FIGS. 4, 9 and 14.

The single layered web, such as web 62, formed by the coil wrapping and flattening patterns shown in FIGS. 11 and 12 can be used to create field windings for stators to operate with rotors having more than four magnetic poles. For rotors having more than four poles, the number of groups in each coil should equal one half of the number of poles. For example, three coil groups (such as A1, A2 and A3) should be wound on a mandrel if the corresponding rotor has six poles. To form stator coils to be used with rotors having more than four poles, the winding of the stator coils on a mandrel and the flattening of the wound coils into a web may use the same procedures described above in connection with FIGS. 18 and 19.

Figure 18:
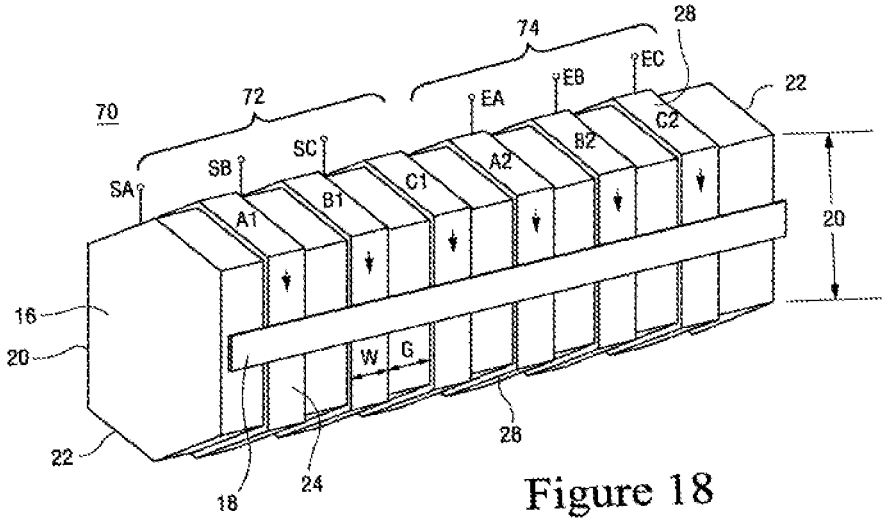
FIG. 18 is a schematic diagram of a fourth arrangement of three coil windings wrapped in two coil groups on a mandrel.

FIG. 18 is a schematic diagram of a fourth coil winding arrangement 70 of three coil windings (A, B, C) wrapped in two coil groups 12, 14 (A1, B1 and C1, and A2, B2 and C2) on a mandrel 16. The fourth coil winding arrangement is similar to the three coil winding shown in FIG. 1, except that the second coil group (A2, B2 and C2) is wound in the same direction as the first coil group (A1, B1 and C1). In contrast, the second coil group (A2, B2 and C2) of the first coil winding arrangement 10 is wound in an opposite direction to the coil winding direction of the first coil group (A1, B1 and C1). The fourth coil winding arrangement is suitable for use as a stator field winding for a four pole rotor, whereas the first coil winding arrangement is suitable for use as a stator field winding for a two pole rotor.

The fourth coil winding arrangement 70 includes two groups of three coils (A1, B1 and C1—Group 72, and A2, B2 and C2—Group 74) wound on a mandrel 16 with each coil being spaced by gap (G) approximately equal to the width (W) of each coil. Adhesive tape 18 is placed on each side of coils to hold them together. Coils A1-A2, B1-B2, and C1-C2 form a three phase field winding unit for a stator to be used with a four pole rotor. For rotors having more than four poles, the number of coil groups should be set to be equal to one half of the number of pole counts. For example, a stator for a six pole rotor should have a stator field winding formed of three coil groups all wound around the mandrel in the same direction.

Each coil group 12, 14 is formed by winding the wires in a tight spiral where each turn of the wire is adjacent the next in each coil winding. The ends at the start turn of each winding is indicated by SA, SB and SC respectively. The ends at the last turn of each coil winding is indicated by EA, EB and EC, respectively. Automatic coil winding mechanisms, which are well known in the art, may be used to automatically wind the wires around the mandrel. The wires of each winding are first wound in a first direction (winding directions indicated by arrows) to form a first group 12 of a coil. The first coil group comprises a predetermined number of turns, e.g., 25 to 250, of the wire. The wire turns are typically tightly packed together in a side-by-side arrangement against the surface of the mandrel to form a single layer of wound coils.

A separate wire is used to form each coil winding. As shown in FIG. 1, three insulated wires (A, B, C) are wound around the mandrel. The wires are wound in the same winding direction to form the first coil group (A1, B1 and C1) 72 of coils, the second coil group (A2, B2 and C2), and (if the rotor has more than four poles) subsequent coil groups (An, Bn and Cn—not shown). Each coil A, B, C corresponds to a separate insulated wire being wound about the mandrel. Each coil group, e.g., A1, B1 and C1, has substantially the same number of windings such that the width of each coil group and the number of turns in each coil group is substantially the same. Similarly, the width and number of turns for each coil in one coil group is preferably the same for all coil groups in the coil winding.

The separation between adjacent coil groups, e.g., the gap (G) between a trailing edge of coil group A1 and a leading edge of coil group B1, may be the width (w) of a coil segment. This gap allows a coil segment to be seated in the gap with no overlapping coils when the coils are flattened into a single layer web (See FIG. 19).

After the first group of coil windings (A1, B1, C1)has been wound and before the next group (A2, B2, C2) of coil windings is wound, the conductive wires extending from each completed coil group 72 are shifted axially along the mandrel. The axial shift moves the conductive wires from the trailing edge of a completed first coil group, e.g., A1, to a leading edge of a second coil group, e.g., A2, to be wound. For a three-phase coil with two coil groups, the distance of the axial shift is five (5) times the width (W) of a coil winding segment.

The axial shift will be different for polyphase coil windings having other than three phases and different numbers of coil groups. In general, the axial shift from a completed coil group 72 to a new coil group 74 is [the number of coil groups times] *twice* the number of coil windings, minus one. This axial shift algorithm will provide windings that can be folded into a single layer web of coils.

Figure 19:
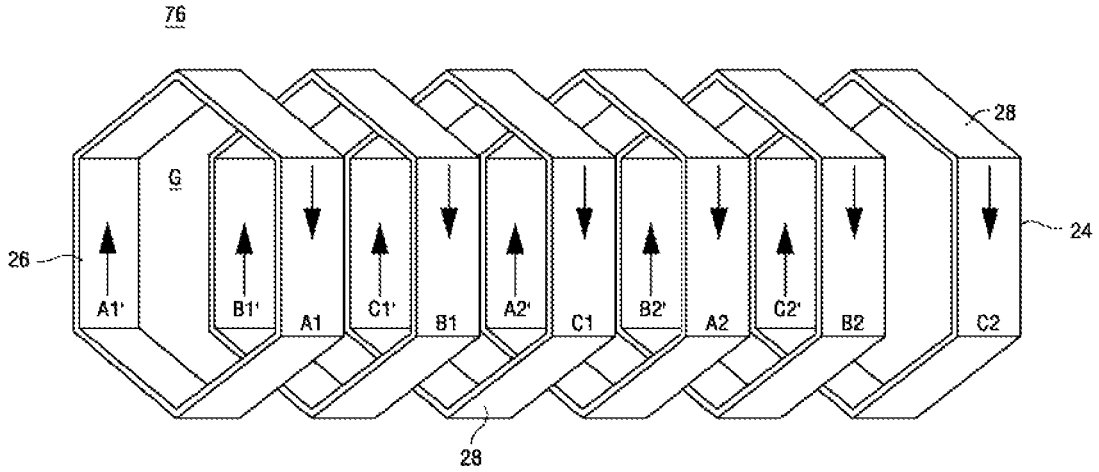
FIG. 19 is a schematic diagram of the coils shown in FIG. 18 with the mandrel removed and the coil windings collapsed in a single layered web.

FIG. 19 shows the coil winding (shown in FIG. 18) after removal of the mandrel. The coils are flattened into a single layered web 76. To ensure proper interleaving of coil segments. During the flattening process, a segment, e.g., A1, on a first side of the coil is shifted axially towards a position in a gap between selected segments, e.g., B1' and C1', on an opposite side of the coils. The coil segments are arranged in the web such that the segments (e.g., A1', B1', A1, C1', B1, A2', C1, B2', A2, C2', B2, and C2) are in parallel and do not overlap. The coil segments 24, 26 (e.g., A1, B1, C1, A1', B1' and C1') are the portions of the web that will form the stator sections adjacent the rotor. The coil segments 24, 26 will be arranged in the stator such that they are parallel to the rotational axis of the rotor.

Figure 20:
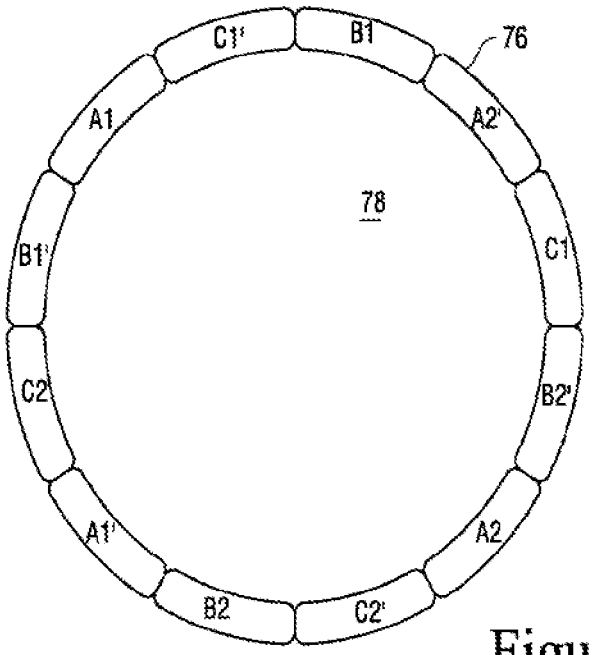
FIG. 20 is a schematic cross-sectional diagram of an end view of a web of coils shown in FIG. 19 arranged in a flux return ring.

FIG. 20 is a cross-sectional view of the web segments of the web 76 formed into a cylindrical stator field winding 78. The web is rolled into a cylindrical shape with interleaved coil segments. The coil segment (A1') at the of the web interleaves with other coil segments (B2 and C2) and does not overlap these other segments. The inner diameter of the cylindrical we is substantially the diameter of the interior diameter of the stator. The stator segments are parallel to the axis of the cylinder. The four pole rotor (see rotor represented by the North, South, North, South poles in FIG. 21) fits coaxially in the cylindrical stator field winding 78 formed by the web 76. The coil segments from each of the coil windings (A, B, C) are arranged in the stator such that current flows in the same direction on opposites side of the stator.

Figure 21:
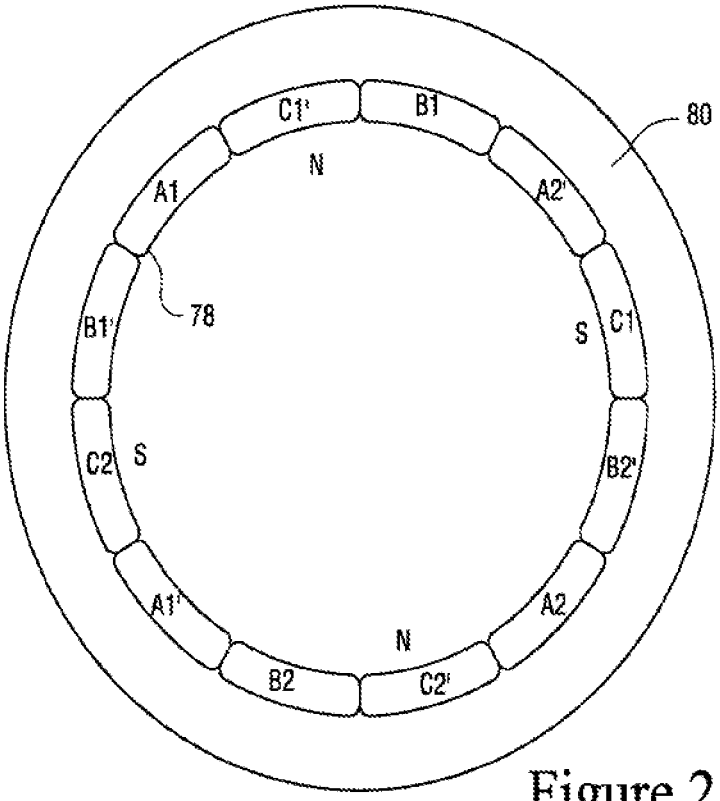
FIG. 21 is a schematic diagram of an end view of a cylindrical coil web shown in FIG. 2 mounted in a flux return ring to form a stator.

FIG. 21 shows the cylindrically shaped stator field winding 78 inserted into a ferromagnetic ring 80 that provides a magnetic flux return path. An arbor may be inserted into the inner periphery of the cylinder formed by the coil web to establish the insider diameter (ID) of the stator. Further, the end turns 28 of the coil windings are arranged tightly on opposite ends of each segment (at opposite ends of the stator) to minimize the overall stator height. The coils are secured to the return path ring 80 using various means including molding. The web and return path form a slotless stator. The cylindrical stator field winding 78 may be included in a motor or generator having a rotating four pole rotor represented by rotor poles North (N), South (S), North (N) and South (S).

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method for making a poly-phase field winding for a slotless stator including a plurality of coil windings arranged in at least a first coil group and a second coil group, *each of the first coil group and the second coil group including a coil winding formed from separate insulated wire corresponding to each phase of the poly-phase field winding,* said method comprising:

forming the first coil group by winding an insulated wire for each coil winding in a first direction around a mandrel such that each turn of the wire is adjacent a next turn of the wire, wherein each coil winding in the first coil group has substantially the same coil width when completed and a separation between adjacent coil windings in the first coil group is a distance substantially equal to the width of one of the completed windings;

after forming the first coil group, axially shifting along the mandrel the insulated wire from a trailing edge of each coil winding a distance substantially equal to [the number of coil groups multiplied by] *twice* the number of coil windings minus one times the width of one of the completed windings to position the wires at a leading edge of each of coil winding in the second coil group;

forming the second coil group by winding the insulated wire for each coil winding in the same first direction around the mandrel such that each turn of the wire is adjacent a next turn of the wire, wherein each coil winding in the second coil group and the first coil group has substantially the same coil width when completed and wherein a separation between adjacent coil windings in the second coil group is a distance substantially equal to the width of one of the completed windings;

removing the mandrel from the wound first and second coil groups;

collapsing the wound first coil group and the second coil group to a single layer web such that coil winding segments formed on a first side of the mandrel are interleaved with the coil winding segments formed on the opposite side of the mandrel, and wrapping the single layer web into a cylinder to form the field winding.

2. The method of claim 1, wherein each of the coil winding segments from the first coil group is positioned opposite a corresponding coil winding segment from the second group.

3. The method of claim 1, wherein the inner diameter of the cylindrical single layer web is substantially equal to the interior diameter of a stator.

4. The method of claim 1, wherein the coil winding segments are parallel to the axis of the cylinder.

5. The method of claim 1, further comprising coaxially fitting a four pole rotor in the cylinder.

6. The method of claim 1, further comprising mounting the cylinder in an inner surface of an annular magnetic flux return ring.

7. The method of claim 6, wherein the annular magnetic flux ring is a ferromagnetic ring.

8. A [poly-phase] *polyphase* field winding for a slotless stator, comprising:

a plurality of coil windings arranged in a first coil group and a second coil group, *each of the first coil group and the second coil group including a coil winding formed from separate insulated wire corresponding to each phase of the polyphase field winding*;

a single layer cylindrical web including the first coil group and the second coil group collapsed such that coil winding segments formed on a first side of a mandrel are interleaved with the coil winding segments formed on the opposite side of the mandrel, the coil winding segments are arranged in parallel and do not overlap; and each of the coil winding segments from the first coil group is positioned opposite a corresponding coil winding segment from the second group, wherein the plurality of coil windings are formed by winding an insulated wire for each coil winding in a first direction around the mandrel such that each turn of the wire is adjacent a next turn of the wire, wherein each coil winding in the first coil group and the second coil group has substantially the same coil width when completed and a separation between adjacent coil windings is a distance substantially equal to the width of one of the completed windings, and wherein a distance between each coil winding in the first coil group and the related coil winding in the second group formed from the same insulated wire is substantially equal to [the number of coil groups multiplied by] *twice* the number of coil windings in each group minus one times the width of one of the completed windings.

[9. The polyphase winding of claim 8, further including a four pole rotor coaxially fitted within the cylindrical web.]

10. The polyphase winding of claim 8, further comprising an annular magnetic flux return ring mounted on an outer surface of the cylindrical web.

11. The polyphase winding of claim 10, wherein the annular magnetic flux ring is a ferromagnetic ring.

12. The polyphase winding of claim 11, wherein the annular magnetic flux ring is secured to the cylindrical web by molding.

13. A motor including a polyphase winding according to claim 8.

* * * * *